(12) United States Patent
Mota et al.

(10) Patent No.: US 7,140,396 B2
(45) Date of Patent: Nov. 28, 2006

(54) AIR DUCT CONTAINING AN ORGANIC LINER MATERIAL

(75) Inventors: Joseph E. Mota, Littleton, CO (US); Madhumita Molly Datta, Littleton, CO (US)

(73) Assignee: Johns Manville, Denver, CO (US)

( * ) Notice: Subject to any disclaimer, the term of this patent is extended or adjusted under 35 U.S.C. 154(b) by 127 days.

(21) Appl. No.: 10/306,043

(22) Filed: Nov. 27, 2002

(65) Prior Publication Data

US 2004/0118472 A1 Jun. 24, 2004

(51) Int. Cl.
*F16L 9/14* (2006.01)

(52) U.S. Cl. .................. 138/149; 138/141; 138/DIG. 4

(58) Field of Classification Search .............. 138/141, 138/143, 149, DIG. 4, DIG. 10; 428/36.91
See application file for complete search history.

(56) References Cited

U.S. PATENT DOCUMENTS

| | | | | |
|---|---|---|---|---|
| 3,340,115 | A * | 9/1967 | Rubenstein | 156/86 |
| 3,748,217 | A * | 7/1973 | May | 442/373 |
| 4,389,587 | A * | 6/1983 | Levine et al. | 310/208 |
| 4,557,297 | A * | 12/1985 | Montana | 138/141 |
| 5,379,806 | A * | 1/1995 | Matthews et al. | 138/149 |
| 5,487,412 | A * | 1/1996 | Matthews et al. | 138/149 |
| 5,783,268 | A * | 7/1998 | Noonan et al. | 428/34.5 |
| 5,918,644 | A * | 7/1999 | Haack et al. | 138/151 |
| 5,944,060 | A * | 8/1999 | MacKay | 138/140 |
| 5,953,818 | A * | 9/1999 | Matthews et al. | 29/890.144 |
| 6,148,867 | A * | 11/2000 | Matthews et al. | 138/149 |
| 6,161,593 | A * | 12/2000 | Lardillat et al. | 138/149 |
| 6,207,245 | B1 * | 3/2001 | Miller et al. | 428/41.8 |
| 6,231,704 | B1 * | 5/2001 | Carpinetti | 156/71 |
| 6,270,865 | B1 * | 8/2001 | Noonan et al. | 428/34.5 |
| 6,457,237 | B1 * | 10/2002 | Matthews et al. | 29/890.144 |
| 6,527,014 | B1 * | 3/2003 | Aubourg | 138/149 |
| 6,769,455 | B1 * | 8/2004 | Toas et al. | 438/149 |
| 6,837,273 | B1 * | 1/2005 | Woolstencroft et al. | 138/98 |
| 2002/0139429 | A1* | 10/2002 | Toas et al. | 138/149 |
| 2002/0146521 | A1* | 10/2002 | Toas et al. | 428/34.1 |
| 2003/0234057 | A1* | 12/2003 | Woolstencroft et al. | 138/125 |
| 2003/0236043 | A1* | 12/2003 | Calzavara et al. | 442/79 |
| 2004/0069362 | A1* | 4/2004 | Lessard et al. | 138/149 |
| 2004/0163724 | A1* | 8/2004 | Trabbold et al. | 138/149 |

* cited by examiner

*Primary Examiner*—James Hook
(74) *Attorney, Agent, or Firm*—Robert D. Touslee; Timothy G. Hofmeyer

(57) ABSTRACT

Provided is an air duct suitable for conducting a flow of air. The air duct includes a central layer formed from a fiber glass. The central layer has an inner surface and an outer surface. The air duct also includes a liner layer arranged adjacent to the inner surface of the central layer. The liner layer is formed from an organic material and is substantially free of fiber glass, or is formed from polyester and rayon. The central layer and liner layer are arranged to define a channel for conducting a flow of air.

10 Claims, 2 Drawing Sheets ived from the Fourdrinier process.

AIR DUCT CONTAINING AN ORGANIC LINER MATERIAL

BACKGROUND OF THE INVENTION

1. Field of Invention

The present invention relates to an air duct for conducting a flow of air, and more particularly to an air duct containing an organic liner material.

2. Description of the Related Art

Air ducts are typically manufactured from resin-bonded fiber glass formed into rigid, rectangular boards. Air duct systems manufactured from such boards are used in commercial and residential air-conducting systems for, ventilating, cooling, heating or dual-temperature service.

The interior surfaces of conventional air ducts are typically lined with a fabric formed from fiber glass fibers or a blend of fiberglass fibers and polymer fibers, such as polyester or styrene fibers. However, use of such liner materials can lead to several problems. For example, liner materials containing fiber glass, and especially a substantial amount of fiber glass, can release glass fibers into the air stream flowing through the air duct, which can be objectionable to particular users.

In addition, the touch and feel of such liner materials, i.e., the coarse texture thereof due to the presence of a substantial amount of fiber glass, can also be objectionable to particular users. Further, fabrics containing fiber glass material are typically formed from a Fourdrinier process, wherein such process can be relatively expensive.

One object of the present invention is to provide an air duct for conducting flowing air, which can reduce or eliminate the amount of glass fibers released from the air duct. Another object of the present invention is to improve the touch and feel of the liner material of the air duct. A further object of the present invention is to provide an air duct which can be produced in a cost-effective manner.

Other objects and aspects of the present invention will become apparent to one of ordinary skill in the art upon review of the specification, drawings and claims appended hereto.

SUMMARY OF THE INVENTION

The foregoing objectives can be met by the air ducts and methods for forming same, in accordance with the present invention. According to a first aspect of the present invention, an air duct suitable for conducting a flow of air, comprises:

a central layer comprising a fiber glass, wherein the central layer has an inner surface and an outer surface; and a liner layer arranged adjacent to the inner surface of the central layer, wherein the liner layer comprises an organic material and is substantially free of fiber glass, wherein the central layer and liner layer are arranged to define a channel for conducting a flow of air.

According to a second aspect of the present invention, an air duct suitable for conducting a flow of air, comprises:

a central layer comprising a fiber glass, wherein the central layer has an inner surface and an outer surface; and a liner layer arranged adjacent to the inner surface of the central layer, wherein the liner layer comprises polyester and rayon, wherein the central layer and liner layer are arranged to define a channel for conducting a flow of air.

BRIEF DESCRIPTION OF THE DRAWINGS

Objects and advantages of the present invention will become apparent from the following detailed description of the preferred embodiments thereof taken in connection with the accompanying drawings in which.

DETAILED DESCRIPTION OF THE PREFERRED EMBODIMENTS OF THE PRESENT INVENTION

Figure 1:
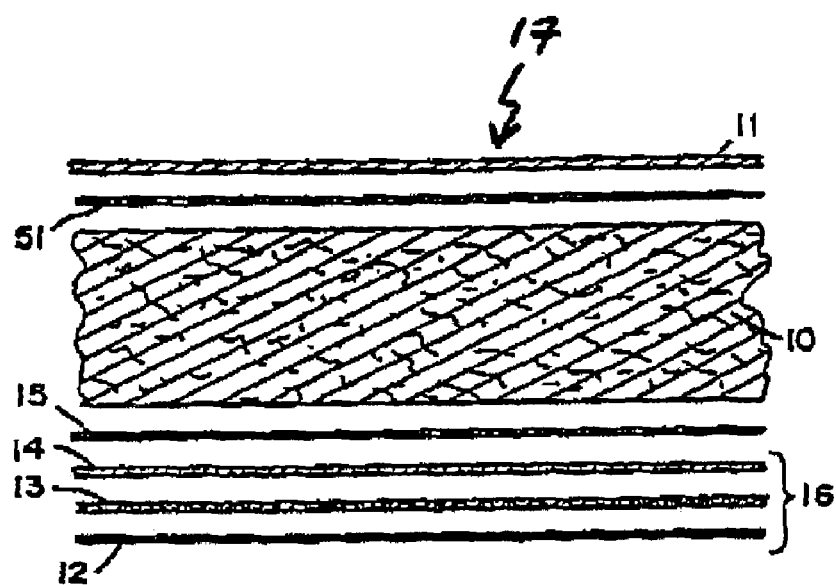
FIG. 1 is a cross-sectional, exploded view of an exemplary air duct board according to one aspect of the present invention.
Figure 2:
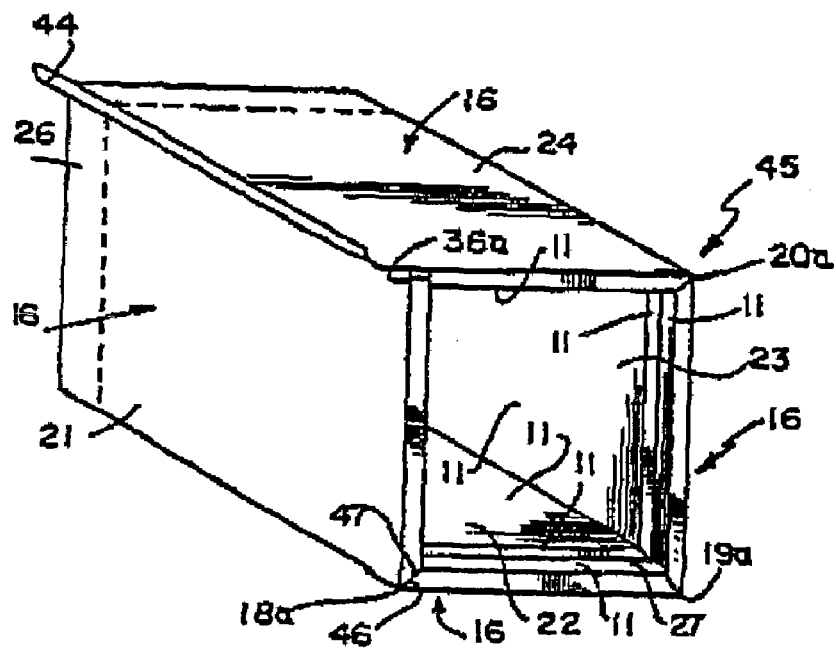
FIG. 2 is a perspective view of a section of an exemplary air duct according to another aspect of the present invention.

Referring to FIGS. 1 and 2, an air duct board 17 can be used to form a section of an air duct 45. A plurality of the sections of air duct 45 can be connected together to form an air conducting system useful in ventilation systems, cooling systems, heating systems and/or dual-temperature service systems.

Referring to FIG. 1, the air duct board 17 includes a central layer 10. The central layer 10 can be formed from any material which can provide a sufficient degree of insulation, sound absorption and/or structural strength for the particular application of the air duct. Preferably, the central layer 10 can include fiber glass, for example, as the main component. The central layer 10 can be formed by any conventional method such as, for example, employing a rotating glass fiberizer. Thereafter, the central layer 10 can optionally be compressed.

The central layer 10 can also include a curable compound. Preferably, the curable compound is distributed throughout the fiber glass. The curable compound can be present in an amount effective to bind the material in the central layer 10 to form a substantially rigid article. Alternatively, the curable compound can be present in an amount effective to allow for a predetermined amount of flexibility of the article. For example, the curable compound can be a thermosetting compound which binds the fiber glass upon the application of a sufficient amount of heat. Examples of curable compounds include a urea-formaldehyde binder and an acrylic binder as described in U.S. Pat. No. 5,763,524, the contents of which are incorporated herein by reference.

The air duct board 17 preferably has a thickness which provides a sufficient degree of insulation, sound absorption and/or structural strength for the particular application of the air duct. For example, for residential and commercial uses, the thickness of the central layer 10 can be from about 0.5 to 3 inches, preferably about 1, 1.5 or 2 inches, and most preferably about 1.5 inches.

A liner layer 11 can be arranged above the central layer 10 and preferably forms at least part of the interior surface of the section of air duct 45. The liner layer 11 is preferably directly attached to the central layer 10, for example, by the application of heat. Additionally or alternatively, an adhesive can be used to increase the adhesion of the liner layer 11 to the central layer 10. For example, the adhesive can form an adhesive layer 51 between the liner layer 11 and the central layer 10.

The liner layer 11 includes a non-glass material such as an organic material, preferably a polymer material. For example, the liner layer 11 can include polyester, or a blend of polyester and a polymer material different from polyester. In an exemplary embodiment, the liner layer 11 is formed from rayon and polyester. The polymer material such as rayon and polyester can be present in the liner layer 11 in a weight ratio of from about 50:50 to 80:20, preferably from about 60:40 to 75:25, more preferably about 70:30.

In one embodiment, the liner layer 11 is substantially free from containing a glass material such as fiber glass. In this embodiment, the term "substantially free" means that the liner layer 11 can contain only trace amounts of the glass material such as fiber glass. In a less preferred embodiment, the liner layer 11 can contain a small amount of a glass material such as fiber glass, for example, about 5% by weight or less, more preferably about 1% by weight or less.

The liner layer 11 can be formed by any conventional method. For example, the liner layer 11 can be spun-bond. According to one embodiment, the liner layer 11 can be formed by a non-Fourdrinier process. A non-Fourdrinier process can be used, for example, to form an embodiment in which the liner layer 11 is substantially free of fiber glass. By not employing a Fourdrinier process, the liner layer 11 can be produced by less expensive processes.

The liner layer 11 can optionally contain an antimicrobial agent effective to reduce or eliminate the presence of undesirable organisms in the liner layer 11. For example, the antimicrobial agent can be effective to reduce or eliminate the presence of mold in the liner layer 11. The antimicrobial agent can be added to the liner layer 10 before and/or after the liner layer 11 is introduced into a curing oven, which is discussed below in further detail. Optionally, the liner layer 11 can be colored by a suitable colorant.

The weight, strength and flexibility properties of the liner layer 11 typically can be a function of the particular materials used to form the liner layer 11. The desired properties of the liner layer 11 can vary depending on the particular application of the air duct. For example, an exemplary liner layer 11 containing about 30% polyester and 70% rayon has a basis weight of about 0.6 ounce per square yard. The tensile strength of such liner layer 11 can be about 3.9 lb./inch in the cross machine direction (CMD) and about 10.3 lb./inch in the machine direction (MD).

Figure 5:
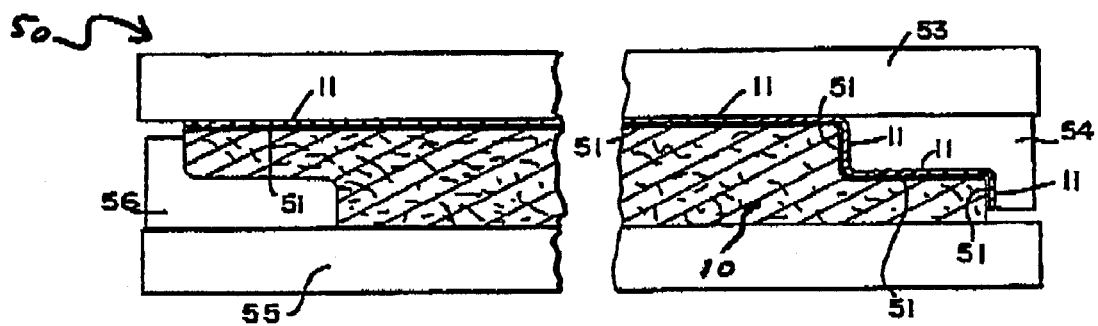
FIG. 5 is a cross-sectional view of an oven for forming an exemplary air duct board according to another aspect of the present invention.

Referring to FIG. 5, the product formed by the liner layer 11 and the central layer 10 can be cured in a curing oven 50. The heat from the oven 50 can be effective for curing the curable compound present in the central layer 10, thereby increasing the rigidity of the central layer 10. The heat from the oven 50 can also be effective to increase the adhesion of the liner layer 11 to the central layer 10. As discussed above, an optional adhesive layer 51 can be used to increase the adhesion of the liner layer 11 to the central layer 10.

The inventors have surprisingly and unexpectedly discovered that the combination of rayon and polyester as a liner material can withstand extreme temperatures reached in the curing oven 50, for example, as high as 500 F, without any significant melting of the rayon and polyester liner material. In particular, rayon and polyester materials having a ratio of about 70:30 can provide a high resistance to melting.

Preferably, the curing oven 50 has a top flight 53 to which a shoe 54 is secured, and a bottom flight 55 to which a shoe 56 is secured. Referring to FIGS. 2 and 5, the shoes 54, 56 can enable the formation of male and female engaging ends 26, 27 of the board 17. The male and female engaging ends 26, 27 enable the section of the air duct 45 formed from the board 17 to be securely attached to the ends of other sections of the air duct. Preferably, the male and female engaging ends 26, 27 extend along the entire width of the board 17.

Referring to FIG. 1, the air duct board 17 can include an exterior layer 16. The exterior layer 16 preferably forms at least a part of the exterior surface of the section of air duct 45. The exterior layer 16 can be arranged below the central layer 10, opposite the side to which the liner layer 11 is attached. Preferably, the exterior layer 16 is directly attached to the central layer 10. Additionally or alternatively, an adhesive can be used to increase the adhesion of the exterior layer 16 to the central layer 10. For example, an adhesive layer 15 can be formed between the exterior layer 16 and the central layer 10.

The exterior layer 16 preferably is formed from a foil layer 12, a scrim layer 13 and/or a kraft layer 14. The foil layer 12, scrim layer 13 and kraft layer 14 can be attached together using any suitable adhesive material, preferably a flame-retardant adhesive.

The foil layer 12 can be arranged as the outermost layer of the exterior layer 16. That is, the foil layer 12 is preferably the layer of the exterior layer 16 that is furthest from the central layer 16. The foil of the foil layer 12 can be formed from any metallic material, preferably aluminum. The foil layer 12 can be of any suitable thickness such as, for example, about 0.0005 to 0.001 inch.

The scrim layer 13 can be arranged between the foil layer 12 and the kraft layer 14. The scrim layer 13 can be formed from, for example, a tri-directional fiber glass yarn.

The kraft layer 14 can be arranged as the innermost layer of the exterior layer 16. That is, the kraft layer 14 can be the layer of the exterior layer 16 that is closest to the central layer 10. The kraft layer 14 can be attached to the central layer 10 by the use of an adhesive such as, for example, a water-based adhesive. The adhesive can form a layer 15 arranged between the exterior layer 16 and the central layer 10. The kraft layer 13 can be formed from a conventional natural kraft paper having, for example, a weight of about 30 lbs. per 3,000 square feet.

Figure 4:
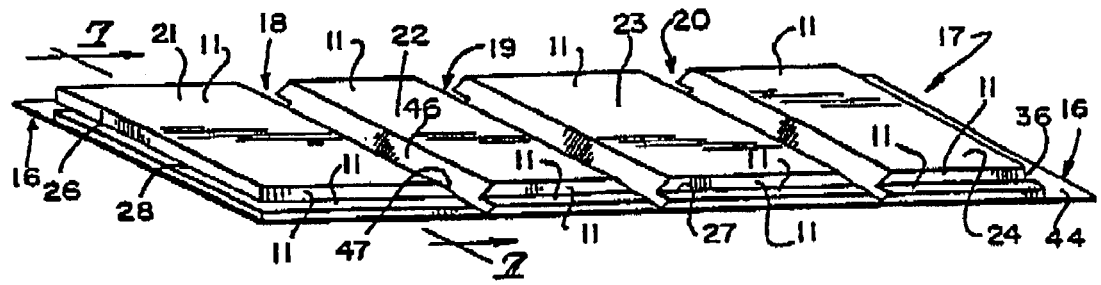
FIG. 4 is a persective view of an exemplary air duct board according to another aspect of the present invention.

Referring to FIG. 2, a section of air duct 45 formed from the air duct board 17 is shown. Referring to FIG. 4, a plurality of grooves 18, 19, 20 can be disposed on the surface of the air duct board 17. The grooves 18, 19, 20 can be of any shape which allows the board 17 to be easily folded at the grooves, 18, 19, 20. Preferably, the grooves 18, 19, 20 are V-shaped.

The number of grooves depends on the desired number of sides of the air duct. For example, to form a section of air duct having four sides, three grooves can be formed on the air duct board 17. Preferably, the lengthwise dimension of each groove is substantially parallel to the shorter sides of the duct board 17 and substantially perpendicular to the longer sides of the board 17. The plurality of grooves divide the board 17 into sections 21, 22, 23 and 24. Preferably, the grooves are evenly spaced on the board 17.

In one embodiment, the two edges of the air duct board 17 along the widthwise direction of the board 17 engage one another to form the section of air duct 45. Any conventional means for forming a connection between the two edges of the board 17 can be used. For example, the right edge can have a flat surface 36 perpendicular to the surface of the board 17. A flap 44 can be formed from the exterior layer 16 extending from the flat surface 36. The left edge can have a recessed area 28 which engages with the flat surface 36.

The grooved duct board 17 can be folded along the three grooves 18, 19, 20 to form a portion of an air duct 45. The edges 46, 47 of groove 18 can be rotated 90 degrees with respect to each other to form an inclined joint 18*a*. Preferably, the edges 46, 47 contact each other in such rotated position. Similar joints can be formed at 19*a* and 20*a*. A line or butt joint can be formed at 36*a* where flat surface 36 contacts recessed area 28. Flap 44 can be folded down and fastened to the exterior surface of section 21 by any suitable fastening means such as, for example, a piece of tape.

Figure 3:
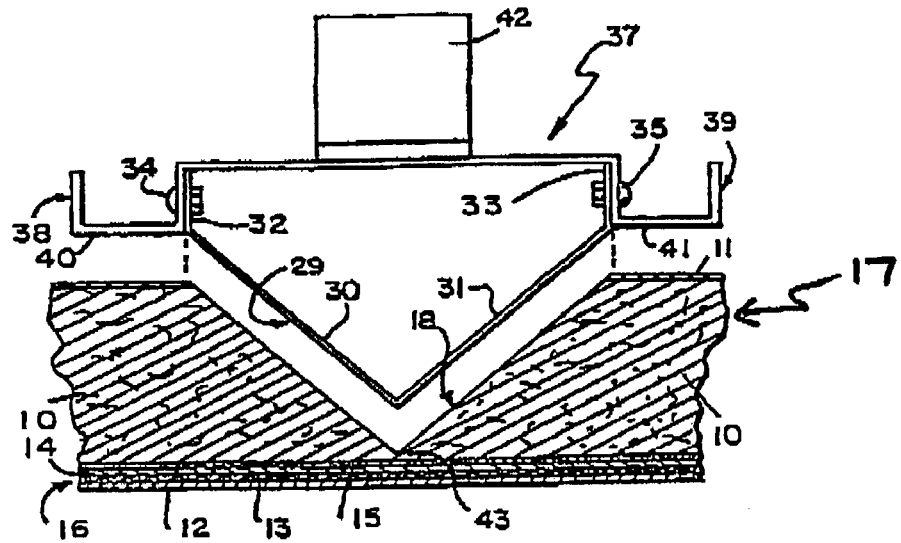
FIG. 3 is a cross-sectional, magnified view of a groove disposed on an exemplary air duct board according to another aspect of the present invention.

Referring to FIG. 3, an exemplary method of forming the plurality of grooves can include placing the air duct board 17 on a cutting table or in a fixture. A knife 29 having cutting edges 30, 31 can be driven across the duct board 17 to form a groove 18. In order to form the preferred V-shape groove, the knife 29 can have a V-shaped blade.

The knife 29 can be automatically driven or can be manually driven using a handle 42. The knife blade can have upper flanges 32, 33 which are fastened by any suitable means, such as bolts 34, 35 to a combined handle and spacer 37. The handle and spacer 37 can include a pair of shoes 38, 39 having lower surfaces 40, 41. Such lower surfaces 40, 41 can contact and slide on the liner layer 11 on each side of the groove 18 as the knife 29 is driven across the duct board 17 to form the groove 18.

The depth of cut of the knife 29 is preferably slightly less than the combined thickness of the liner layer 11 and the central layer 10. As a result, a thin layer 43 of the central layer material can remain above and in contact with the exterior layer 16 so that the cutting of the exterior layer 16 with the knife 29 can be ameliorated or avoided. For example, the thin layer 43 can protect the exterior layer 16 from degradation. Preferably, the thin layer 43 is sufficiently thin so as to not significantly impede the folding of the grooved duct board 17 along the grooves 18, 19, 20.

As discussed above, it can be preferable to arrange grooves on the surface of the board 17 to allow the board 17 to be folded along such grooves, thereby forming a section of air duct 45. In an alternative embodiment of the present invention, the board 17 does not have grooves formed on the surface thereof. In this embodiment, the board 17 can also not include an exterior layer 16. This alternative embodiment can be useful as a liner for existing air duct systems.

While the invention has been described in detail with reference to specific embodiments thereof, it will be apparent to one skilled in the art that various changes and modifications can be made, and equivalents employed without departing from the scope of the claims.

What is claimed is:

1. An air duct suitable for conducting a flow of air, comprising:
    an insulative layer comprising a fiber glass, wherein the insulative layer has an inner surface and an outer surface; and
    a liner layer arranged adjacent to the inner surface of the insulative layer, wherein the liner layer is formed from polyester and rayon and is substantially free of fiber glass, wherein the weight ratio of rayon to polyester is from about 50:50 to 80:20,
    wherein the insulative layer and liner layer are arranged to define a channel for conducting a flow of air,
    wherein the liner layer is the innermost layer of the air duct, and
    wherein the liner layer formed from polyester and rayon forms the interior surface of the air duct.

2. The air duct of claim 1, wherein the insulative layer further comprises a curable compound.

3. The air duct of claim 1, wherein the liner layer is attached to the inner surface of the insulative layer.

4. The air duct of claim 1, wherein the cross-sectional profile of the air duct is rectangular or elliptical.

5. The air duct of claim 1, further comprising an exterior layer comprising a foil layer, a scrim layer and a kraft layer, wherein the kraft layer is arranged adjacent to the outer surface of the insulative layer.

6. The air duct of claim 1, wherein the foil layer is the outermost layer of the air duct.

7. A method for forming the air duct of claim 1, comprising:
    arranging the liner layer adjacent to the interior surface of the insulative layer,
    heating the liner layer and insulative layer to attach the liner layer to the insulative layer; and
    arranging the liner layer and the insulative layer to define the channel for conducting a flow of air.

8. The air duct according to claim 1, wherein the cross-sectional profile of the air duct is substantially rectangular.

9. The air duct according to claim 1, wherein the liner layer comprises an antimicrobial agent.

10. The air duct according to claim 1, wherein the weight ratio of rayon to polyester is from about 60:40 to 75:25.

* * * * *